United States Patent [19]
Ruppin et al.

[11] Patent Number: 5,404,124
[45] Date of Patent: Apr. 4, 1995

[54] FOIL STRAIN GAGE AND LOAD CELL WITH SUCH A STRAIN GAGE

[75] Inventors: Hagen Ruppin, Nauheim; Stephan Mohr, Erzhausen; Werner Breitwieser, Rossdorf, all of Germany

[73] Assignee: Hottinger Baldwin Messtechnik GmbH, Darmstadt, Germany

[21] Appl. No.: 147,819

[22] Filed: Nov. 2, 1993

[30] Foreign Application Priority Data

Nov. 4, 1992 [DE] Germany .................. 42 36 985.1

[51] Int. Cl.6 .................................................. G01L 1/22
[52] U.S. Cl. .................................................. 338/2; 338/5
[58] Field of Search ............................ 338/2–5; 428/209, 210, 212, 461; 156/233; 177/211

[56] References Cited

U.S. PATENT DOCUMENTS

| | | | |
|---|---|---|---|
| 3,609,624 | 9/1971 | Nagy | 338/2 |
| 4,050,976 | 9/1977 | Reiters | 338/2 X |
| 4,195,279 | 3/1980 | Lemcoe et al. | 338/2 |
| 4,696,851 | 9/1987 | Pryor | 428/210 |
| 4,942,095 | 7/1990 | Buchert et al. | 428/461 |
| 5,192,938 | 3/1993 | Ort | |

FOREIGN PATENT DOCUMENTS

| | | |
|---|---|---|
| 0229553 | 7/1987 | European Pat. Off. |
| 0321225 | 6/1989 | European Pat. Off. |
| 0469323 | 2/1992 | European Pat. Off. |
| 728606 | 4/1955 | United Kingdom |
| WO90/06957 | 6/1990 | WIPO |

OTHER PUBLICATIONS

Article entitled: Polyaryletherketone, PAEK, PEK, PEEK, PEKK, PEEKK, PEEKEK, PEKEKK pp. 1 to 16 of Neue Konstruktionsmoeglichkeiten Mit Kunststoffen by Fein, Kunz, Weka-Verlag (New Construction Possibilities With Synthetic Materials) Nov. 1990.

Primary Examiner—Marvin M. Lateef
Attorney, Agent, or Firm—W. G. Fasse; W. F. Fasse

[57] ABSTRACT

A foil strain gage or a transducer or load cell with such a strain gage has a backing to which a resistor grid is bonded, made of polyaryletherketone and preferably also a cover of polyaryletherketone.

20 Claims, 1 Drawing Sheet

FOIL STRAIN GAGE AND LOAD CELL WITH SUCH A STRAIN GAGE

FIELD OF THE INVENTION

The invention relates to foil strain gages and to load cells comprising such foil strain gages. The foil strain gage includes a backing and a measuring resistor grid on the backing.

BACKGROUND INFORMATION

Foil strain gages of the type mentioned above are known from British Patent 728,606 (Eisler), published on Apr. 20, 1955. According to this publication, a meandering measuring resistor grid is formed of a very thin rolled out metal foil by a photolithographic etching technique, whereby the ends of the measuring resistor grid are formed as contact area. Thereafter, an electrically insulating epoxy resin backing is applied to the metal foil. Since the epoxy resin backing is rather brittle, it is necessary to handle such foil strain gages with the utmost care and precaution during manufacturing, during handling, and during application of the foil strain gage to an element in which forces are to be measured in order to avoid breaking the strain gage. The same basically applies to load cells comprising such foil strain gages. The same considerations apply to strain gages with backings made of phenolic resin. As a result, conventional strain gages with epoxy resin backings and with phenolic resin backings have not been used in tension analysis applications.

Suggestions have been made to reinforce phenolic and epoxy resin backings with glass fiber fleeces. However, foil strain gages having such backings are still rather brittle and break easily, especially during cutting and during handling. Another drawback of glass fiber reinforced backings is seen in the fact that the glass fiber fleeces themselves have faults so that the waste is quite substantial during manufacture and application of such strain gages in cells and transducers.

Foil strain gages with polyimide or polyamide backings are known to have rather robust characteristics and strain gages of this type have been used in tension analysis applications. However, strain gages with polyimide or polyamide backings are not suitable for precision measurements, due to their strong creeping characteristics.

Another problem with conventional foil strain gages resides in the fact that the backing and/or the cover or encapsulation changes its characteristic in response to the relative humidity either by swelling or by shrinking. Both, swelling and shrinking are undesirable because they cause a direct change in the resistance of the measuring grid, whereby a humidity dependent null signal is unavoidable. Still another drawback of conventional foil strain gages is the fact that the creeping characteristic is temperature dependent. Such dependency of the creeping on the temperature is not easily controlled with economically feasible compensating measures, whereby these strain gages are useful only for predetermined temperature ranges. Swelling and/or shrinking have an even larger adverse effect on the measured result when the backing of the strain gage and the cover of the strain gage are exposed to conditions causing swelling and/or shrinking. German Patent (DE-PS) 4,011,314, corresponding to U.S. Pat. No. 5,192,938 (Ort), issued on Mar. 9, 1993, discloses foil strain gages with a backing of polyphenylenesulfide. These foil strain gages have excellent robust mechanical characteristics with optimal creeping properties and a very small tendency to swell. PPS provides an excellent seal against moisture penetration. Furthermore, foil strain gages with polyphenylenesulfide backings can be manufactured economically and these strain gages are free of hysteresis faults as well as faults that can be caused by the environment so that highly precise measuring load cells can be produced. However, there is still room for improvement regarding the bonding of the measuring resistor grid structure to the polyphenylenesulfide backing and to the covering. These improvements are especially desirable with regard to the peel strength between the measuring resistor grid structure and the backing, and with regard to the thermal resistance, especially at very high temperatures.

OBJECTS OF THE INVENTION

In view of the above it is the aim of the invention to achieve the following objects singly or in combination:

to construct a foil strain gage and a load cell using such a foil strain gage in such a manner that the respective measuring characteristic is highly linear while simultaneously achieving optimally small or negligible creep characteristics of the overall foil strain gage structure which includes the backing, adhesive bonding, the resistor grid structure and normally a cover;

the foil strain gage and the load cell shall be economical in their manufacture while still providing the required peel strength between the measuring grid and the backing as well as between the measuring grid and any covering;

the thickness of the foil strain gage shall be minimal so that the strain gage can be applied to a measuring point even where there is little space for that purpose;

the strain gage and respective load cell shall not be sensitive to the relative humidity, to water, and other liquids; and the above mentioned peel strength shall be maintained under all operating conditions.

SUMMARY OF THE INVENTION

The above objects have been achieved according to the invention by making the backing of the foil strain gage of a film of polyaryletherketone. Such a film is as impervious to water and moisture as a PPS film, however with the added unexpected benefit of providing a high bonding strength between the measuring grid and the polyaryletherketone film. Additionally, the polyaryletherketone film is heat resistant for temperatures up to 170° C., and even up to 260° C.

The manual "New Construction Possibilities With Synthetic Materials", authors Fein and Kunz, published by WEKA-Verlag, Section 7, Chaper 2.20, pages 1 to 16, describes different material characteristics and applications for this family of polyaryletherketones which form partially crystalline thermoplastic materials. Fein and Kunz mention the use as substrates for printed circuits including flexible printed circuits, however, nothing is mentioned regarding backings and covers for foil strain gages.

Due to the extremely low water absorption of these polyaryletherketone films, it is possible according to the invention to form foil strain gages having both a backing and a covering of polyaryletherketone films. These films are so thin that a fully covered foil strain gage according to the invention can have a thickness that is only slightly thicker than a conventional foil strain gage without a full cover. The backing of a polyaryletherketone film may have a thickness within the range of 25 to 50 $\mu$m. The covering or encapsulation of the same material also has a thickness within the range of 25 to 50 $\mu$m. The thickness of the adhesive bonding layer is about 2 $\mu$m. The thickness of the resistor grid is within the range of about 2.5 $\mu$m to about 5 $\mu$m, preferably 3.8 $\mu$m. However, the thickness of the resistor grid is not critical. Thus, a total thickness of the strain gage having a resistor grid bonded on one side to the backing and on the opposite side to the cover, is within the range of about 60 to about 110 $\mu$m. Such thin strain gages have a distinct space factor advantage over thicker conventional strain gages. According to the invention it is preferred to cover the measuring resistor grid by a cover film of polyaryletherketone. Since this material does not swell under the influence of moisture or other liquid, the present strain gage can be inserted in very small available spaces, even if a backing and a covering of polyaryletherketone are used to make the strain gage. In both instances, namely with and without a cover, the measuring grid is preferably adhesively bonded directly to the backing. The bonding between the measuring resistor grid and the cover as well as between the backing and the cover, is preferably an adhesive bonding. Incidentally, it is also possible to use polyaryletherketone film as a cover for conventional strain gages having backings of conventional backing materials. In both instances, namely when the backing and the cover are made of polyaryletherketone, and even when only the cover is made of polyaryletherketone, a significant reduction is achieved in the adverse influences that can falsify the measuring results by changing the resistance of the measuring resistor grid.

Further, a surprisingly strong peel strength is obtained between the backing and the resistor grid, between the cover and the resistor grid, and between the cover and the backing even without costly surface treatments of the surfaces to be adhesively bonded to each other. It has been found that a high strength adhesive bond can be achieved by merely pretreating the surfaces to be bonded to each other by an inexpensive corona activation to be described in more detail below. Instead of exposing the surfaces to be bonded to a corona discharge, it is possible to pass the surfaces to be bonded through a low pressure plasma. The surfaces involved can also be mechanically roughened prior to the bonding operation for increasing the peel strength. Also, passing the measuring resistor grid through a low-pressure plasma improves the bonding or peel strength. These surface treatments are simple and inexpensive.

According to the invention it has been found that epoxy resin adhesives are especially suitable for producing water-tight foil strain gages having a backing and a cover made of polyaryletherketone films. In order to properly seal the electrical connection between the terminals of the measuring resistor grid and the leads coming out of the encapsulation, a so-called transfer adhesive film is used. Such a transfer adhesive film is preferably a modified acrylic resin sticky on both sides between the backing and the cover layer to provide a water-tight seal around the leads and terminals by embedding these leads in the transfer adhesive film. Two such films may be used, one one each side of the terminals and leads.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
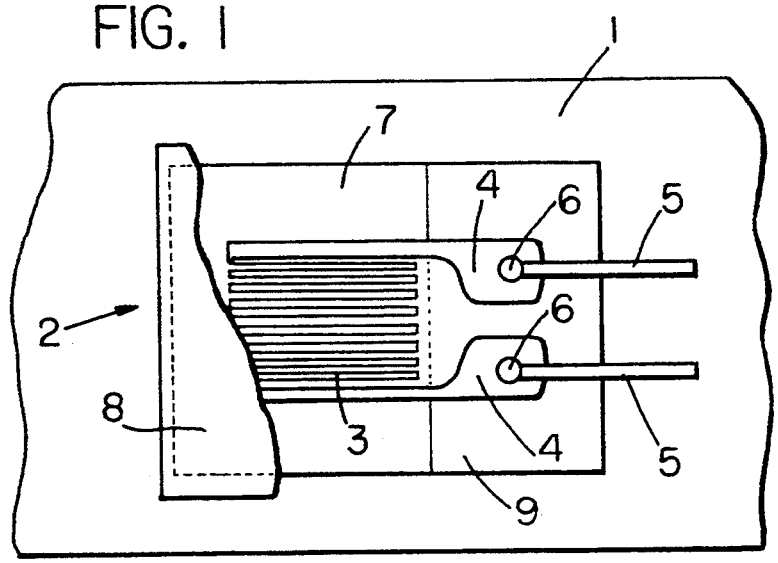
FIG. 1 is a top plan view of a strain gage according to the invention attached to a flat spring member to form a load cell or transducer.

Referring to FIG. 1, a support 1, such as a spring body or the like forming part of a load cell or transducer, carries on one surface a foil strain gage 2 according to the invention. The foil strain gage 2 is adhesively bonded to the support 1 as will be described in more detail below. The foil strain gage 2 comprises a measuring resistor grid 3 having two terminals 4 to which conductor leads 5 are soldered at 6.

According to the invention, the grid 3 is bonded, preferably adhesively bonded, to a backing of polyaryletherketone 7. Preferably, but not necessarily, the grid structure and its terminals are also provided with a cover 8 of polyaryletherketone, also adhesively bonded to the grid 3, to the backing 7, and preferably to an encapsulating transfer film 9 in which the terminals 4, the soldered lead ends 5 and the solder connections 6 are embedded. One embedding transfer film 9, which is sticky on both surfaces, is used in FIG. 2. Two such transfer films are used in FIG. 3.

The measuring grid 3 is conventionally produced by photolithography or the grid structure may be etched into a foil which is secured to a backing, preferably also of polyaryletherketone, whereby an additional polyaryletherketone film or layer could form an encapsulation. Stated differently, the grid 3 can be secured directly or indirectly to the backing 7. An epoxy resin adhesive 10 shown in FIGS. 2 and 3 is used for the bonding, except where the grid 3 is directly bonded to its backing by thin film techniques, for example, when the grid 3 is formed by a thin film deposition.

Figure 2:
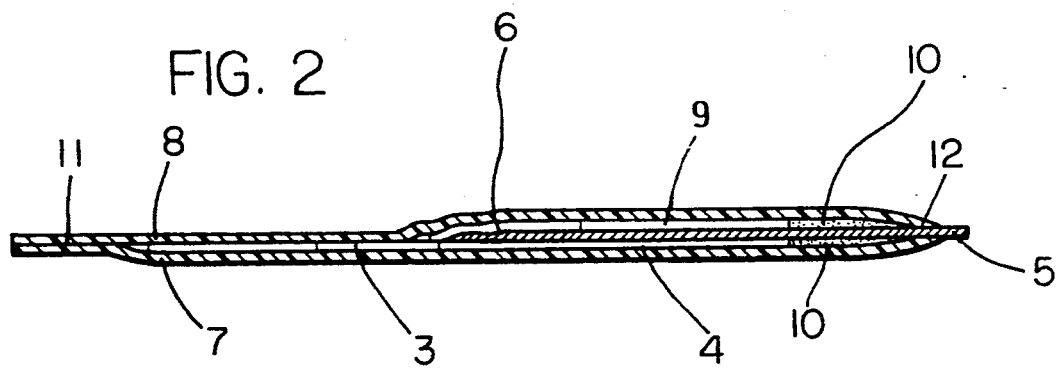
FIG. 2 is a sectional view through a fully encapsulated foil strain gage according to the invention.
Figure 3:
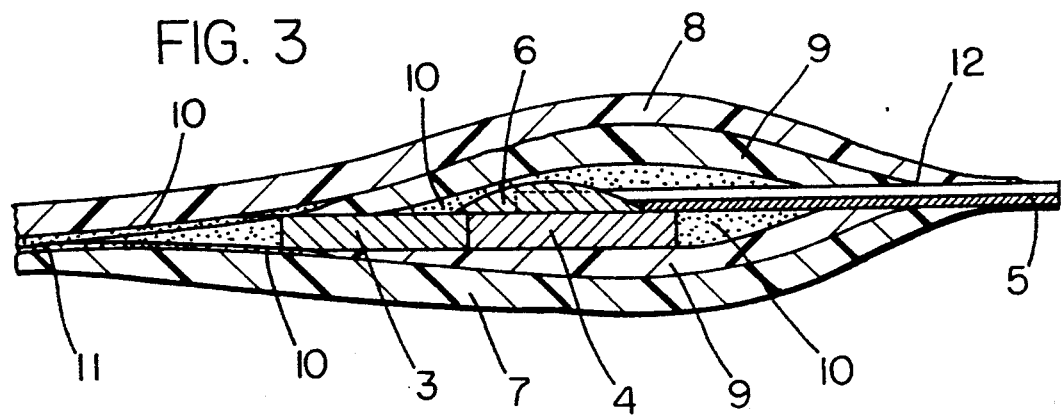
FIG. 3 is a sectional view similar to that of FIG. 2, however, on a substantially enlarged scale to illustrate the encapsulation at least of the terminals and leads of the present strain gage.

FIG. 2 shows one embodiment of an encapsulated strain gage according to the invention where both layers, namely the backing 7 and the cover 8, are made of polyaryletherketone. Outside the grid 3 the backing and the cover are bonded to each other at 11. The encapsulating transfer film 9 covers the soldered connections 6 and the terminals 4 and sticks to both the cover 8 and the terminals 4, including the lead ends and the solder areas. In addition to the hermetic seal 11 a further hermetic seal 12 surrounds the entire encapsulation, whereby the present strain gage may be even used under water. The leads 5 extend through the seal 12 in a sealed manner.

The polyaryletherketone films 7, 8 have a thickness within the range of 25 to 50 $\mu$m, for example. The measuring resistor grid 3 in its etched form has a thickness of about 5 $\mu$m. The adhesive layer 10 has a thickness of about 2 $\mu$m. The transfer film 9, which is sticky on both sides, has a thickness of about 75 $\mu$m or more. The resistor grid 3 with its terminals 4 may, for example, be made of a Constantan foil. When such a foil is bonded by an epoxy resin adhesive, a peel strength of about 3.5 Newton has been measured where the surface area of the bond was about 0.5 inch square. The transfer film 9 is, for example, made of a modified acrylic resin. In addition to the tackiness of the transfer film 9, an adhesive layer 10 may also extend between the cover 8 and the transfer film 9, as well as between the backing 7 and the transfer film 9.

Where a water-tight encapsulation is unnecessary, the present strain gage merely comprises the resistor grid 3 on a backing 7, whereby the backing also supports the terminals 4 and the solder connections 6 with the lead end 5. Preferably, the leads are insulated by a Teflon coating except where the solder connection 6 is made. Due to the high thermal resistance and stability of polyaryletherketone films it is quite efficient to make the lead connections by soldering. However, other connections, for example, with an electrically conducting adhesive may also be made.

The laminating of the various layers to each other is performed by a heat compression operation. Similarly, the strain gage 2 of the invention is bonded to the transducer substrate 1 by heat and pressure.

The present backings 7 and covers 8 are made of any of the polyaryletherketones forming a group of partially crystallized thermoplastic materials, such as PEK, PEEK, PEKK, PEEKK, PEEKEK, and PEKEKK.

The bonding may be further improved by providing a surface treatment of the films to be bonded to each other prior to the bonding operation. For this purpose, the film surfaces of the polyaryletherketones may be mechanically roughened, they may be exposed to a corona discharge, or they may be treated in a low-pressure plasma prior to the application of the resin adhesive.

A surface treatment for increasing the wettability of the polyaryletherketone film surface for applying an adhesive and for achieving a good bonding between the film and the resistor grid and between the film and cover is achieved by exposing the film surface to a corona discharge which can be performed by passing the film through a space formed between two electrodes spaced from each other by about 8 to 15 mm and connected to a source of high voltage of about 12 to 20 kilovolt. The discharge takes place in the atmosphere and substantially improves the wettability of the film surface for an adhesive, e.g. an epoxy adhesive. An exposure of the film to the corona discharge for 1 to 5 seconds is sufficient.

Instead of exposing the film to a corona discharge for activating the film surface for an efficient cooperation with an adhesive, the same effect can be achieved by exposing the film surface to a low-pressure plasma as follows. The backing film is stretched out on a suitable frame that is placed in a plasma generating chamber, wherein a reduced pressure of about 0.6 to 0.8 milibar (gage) is maintained and wherein an atmosphere of hydrogen/argon or oxygen/tetrafluoromethane. The plasma is conventionally generated in the chamber, e.g. by a glow discharge. The exposure time is within the range of several seconds to a few minutes.

The foregoing plasma treatment may also be applied to the resistor grid 3 prior to application of the bonding adhesive for a further improved bond.

The present invention achieves the following advantages: a high linearity of the measured results over a wide load range, an optimal creep characteristic virtually independent of the relative humidity within a wide range of operating temperatures up to about 170° C. to 200° C., an operability even under water, and elimination of faulty measurements due to bonding failures.

Although the invention has been described with reference to specific example embodiments, it will be appreciated that it is intended to cover all modifications and equivalents within the scope of the appended claims.

What we claim is:

1. A foil strain gage comprising a backing, at least one strain responsive measuring resistor grid, and a permanent bond between said backing and said resistor grid, said backing comprising a polyaryletherketone film, whereby said strain gage is substantially free of adverse bonding and atmospheric influences.

2. The foil strain gage of claim 1, wherein said polyaryletherketone film has a thickness within the range of about 25 $\mu$m to about 50 $\mu$m.

3. The foil strain gage of claim 1, wherein said resistor grid has a thickness within the range of about 2.5 $\mu$m to about 5 $\mu$m.

4. The foil strain gage of claim 1, wherein said permanent bond is an adhesive bond having a thickness of about 2 $\mu$m.

5. The foil strain gage of claim 4, wherein said adhesive bond is a resin bond.

6. The foil strain gage of claim 1, further comprising a cover made of a polyaryletherketone cover film, and a further permanent bond between said backing and said cover film and between said measuring resistor grid and said cover film.

7. The foil strain gage of claim 6, wherein each of said backing and said cover has a thickness within the range of about 25 $\mu$m to about 50 $\mu$m.

8. The foil strain gage of claim 6, wherein said cover has a thickness within the range of about 25 $\mu$m to about 50 $\mu$m.

9. The foil strain gage of claim 6, wherein said resistor grid has a thickness within the range of about 2.5 $\mu$m to about 5 $\mu$m.

10. The foil strain gage of claim 6, wherein said permanent bond is an adhesive bond having a thickness of about 2 $\mu$m.

11. The foil strain gage of claim 6, wherein said adhesive bond is a resin bond, such as an epoxy resin bond.

12. The foil strain gage of claim 6, further comprising electrical conductor leads, said resistor grid having electrical terminals electrically connected to said conductor leads, and at least one adhesive transfer film between said cover and said backing, said adhesive transfer film embedding said electrical terminals and said conductor leads where said conductor leads are electrically connected to said electrical terminals.

13. The foil strain gage of claim 12, comprising two adhesive transfer films, one on each side of said electrical terminals for fully encapsulating and embedding said electrical terminals and said conductor leads, for hermetically sealing said foil strain gage against entry of moisture and liquid.

14. The foil strain gage of claim 13, wherein said two adhesive transfer films are made of acrylic resin.

15. A foil strain gage transducer, comprising a substrate, a backing of a polyaryletherketone film bonded to said substrate, and a measuring resistor grid bonded to said backing.

16. The foil strain gage transducer of claim 15, further comprising a cover of a polyaryletherketone film bonded to said backing and to said resistor grid.

17. A method of producing a foil strain gage, comprising the following steps:
(a) preparing a backing film of polyaryletherketone for applying a measuring resistor grid to one surface of said polyaryletherketone film, and
(b) bonding said measuring resistor grid to said one surface of said film.

18. The method of claim 17, wherein said preparing step is performed by roughening said one surface of said film.

19. The method of claim 17, wherein said preparing step is performed by exposing said one surface to one of a low-pressure plasma and a corona discharge.

20. The method of claim 17, wherein said measuring resistor grid is exposed to a low-pressure plasma prior to bonding.

* * * * *

UNITED STATES PATENT AND TRADEMARK OFFICE
CERTIFICATE OF CORRECTION

PATENT NO. : 5,404,124
DATED : April 4, 1995
INVENTOR(S) : Hagen Ruppin et al.

It is certified that error appears in the above-indentified patent and that said Letters Patent is hereby corrected as shown below:

```
On the title page:
Please add to the list of References Cited:
--U. S. Patent 3,611,241  10/1971     Herceg--;
Column 1, line 52, delete ",";
Column 6, line 46, Claim 11, line 1, replace "6" by --10--;
Column 6, line 47, Claim 11, line 2, delete ", such as an
                   epoxy resin bond".
```

Signed and Sealed this

Thirteenth Day of June, 1995

Attest:

BRUCE LEHMAN

*Attesting Officer*           *Commissioner of Patents and Trademarks*